(12) United States Patent
Bentmar et al.

(10) Patent No.: US 8,409,679 B2
(45) Date of Patent: Apr. 2, 2013

(54) PACKAGING LAMINATE, METHOD FOR MANUFACTURING OF THE PACKAGING LAMINATE AND PACKAGING CONTAINER PRODUCED THEREFROM

(75) Inventors: Mats Bentmar, Svedala (SE); Nils Toft, Lund (SE); Hans O. Johansson, Lomma (SE); Lars Bergholtz, Höganäs (SE); Mikael Berlin, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 39 days.

(21) Appl. No.: 13/140,312

(22) PCT Filed: Nov. 23, 2009

(86) PCT No.: PCT/EP2009/008306
§ 371 (c)(1),
(2), (4) Date: Jun. 16, 2011

(87) PCT Pub. No.: WO2010/069451
PCT Pub. Date: Jun. 24, 2010

(65) Prior Publication Data
US 2011/0248076 A1    Oct. 13, 2011

(30) Foreign Application Priority Data
Dec. 17, 2008   (EP) .................................. 08021887

(51) Int. Cl.
*B29D 22/00* (2006.01)
(52) U.S. Cl. ............... 428/36.6; 428/36.7; 428/35.7; 428/35.9; 428/36.91; 156/244.11

(58) Field of Classification Search ................. 428/35.7, 428/35.9, 36.6, 36.7, 36.91; 156/244.11, 156/244.15
See application file for complete search history.

(56) References Cited

U.S. PATENT DOCUMENTS
4,921,733 A * 5/1990 Gibbons et al. ............... 428/34.2
(Continued)

FOREIGN PATENT DOCUMENTS
EP    0 608 808 A1    8/1994
EP    1 086 981 A1    3/2001
(Continued)

OTHER PUBLICATIONS
International Search Report (PCT/ISA/210) issued on Mar. 2, 2010, by European Patent Office as the International Searching Authority for International Application No. PCT/EP2009/008306.

*Primary Examiner* — N. Edwards
(74) *Attorney, Agent, or Firm* — Buchanan Ingersoll & Rooney PC

(57) ABSTRACT

A non-foil packaging laminate for liquid food packaging comprises a core layer of paper or paperboard, outermost liquid tight, heat sealable layers of polyolefin and, applied onto the inner side of the layer of paper or paperboard, an oxygen gas barrier layer formed by liquid film coating of a liquid gas barrier composition and subsequent drying, the liquid composition containing a polymer binder dispersed or dissolved in a liquid medium. The laminate further comprises a layer of a polyolefin-based matrix polymer with inorganic filler particles distributed therein and inorganic particles dispersed also in the gas barrier layer from the liquid gas barrier composition. Also disclosed is a method for manufacturing the packaging laminate and a packaging container made from the packaging laminate.

19 Claims, 6 Drawing Sheets

U.S. PATENT DOCUMENTS

Figure 1A:
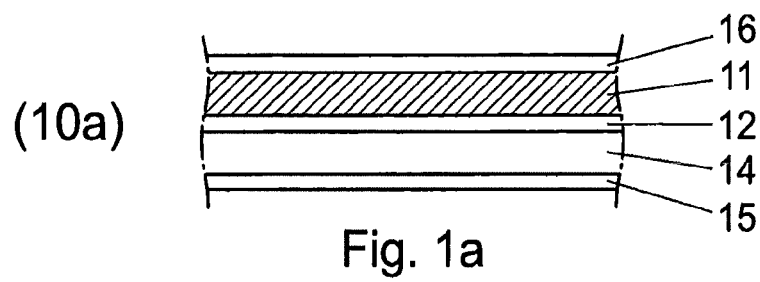

| | | | |
|---|---|---|---|
| 5,738,933 A * | 4/1998 | Koskiniemi et al. | 428/214 |
| 6,071,576 A * | 6/2000 | Bentmar et al. | 428/34.2 |
| 6,585,106 B1 * | 7/2003 | Foster | 198/750.4 |
| 6,821,373 B1 * | 11/2004 | Berlin et al. | 156/244.11 |
| 6,949,275 B2 * | 9/2005 | Johansson | 428/36.7 |
| 7,922,945 B2 * | 4/2011 | Bentmar et al. | 264/135 |
| 2004/0028857 A1 * | 2/2004 | Johansson | 428/36.6 |
| 2004/0266305 A1 * | 12/2004 | Bergholtz et al. | 442/394 |

FOREIGN PATENT DOCUMENTS

| | | |
|---|---|---|
| WO | WO 00/76862 A1 | 12/2000 |
| WO | WO 02/24544 A1 | 3/2002 |
| WO | WO 03/031720 A1 | 4/2003 |
| WO | WO 2005/037535 A2 | 4/2005 |

* cited by examiner (10a)

(10b)

(10c)

(10d)

PACKAGING LAMINATE, METHOD FOR MANUFACTURING OF THE PACKAGING LAMINATE AND PACKAGING CONTAINER PRODUCED THEREFROM

TECHNICAL FIELD

The present invention relates to a non-foil packaging laminate for long-term aseptic packaging of liquid food, comprising a core layer of paper or paperboard, outermost liquid tight, heat sealable layers of polyolefin and, applied onto the inner side of the layer of paper or paperboard, an oxygen gas barrier layer formed by liquid film coating of a liquid gas barrier composition and subsequent drying, the liquid composition containing a polymer binder dispersed or dissolved in an aqueous or solvent-based medium. The invention also relates to a method for manufacturing of the packaging laminate and to a packaging container that is made from the packaging laminate.

BACKGROUND OF THE INVENTION

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, sold for long term ambient storage. The packaging material in this known packaging container is typically a laminate comprising a bulk core layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat sealable adhesive polymers and/or polyolefins. Also on the outside of the core layer, there is an outermost heat sealable polymer layer.

The packaging containers are generally produced by means of modern high-speed packaging machines of the type that form, fill and seal packages from a web or from prefabricated blanks of packaging material. Packaging containers may thus be produced by reforming a web of the laminated packaging material into a tube by the two longitudinal edges of the web being united to each other in an overlap joint. The inner- and outermost heat sealable thermoplastic polymer layers within the overlap joint are welded together by applying heat. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepiped, by fold formation along prepared crease lines in the packaging material.

A layer of an aluminium foil in the packaging laminate provides gas barrier properties quite superior to most polymeric gas barrier materials. The conventional aluminium-foil based packaging laminate for liquid food aseptic packaging is the most cost-efficient packaging material, at its level of performance, available on the market today. Any other material to compete must be more cost-efficient regarding raw materials, have comparable food preserving properties and have a comparably low complexity in the converting into a finished packaging laminate.

Hitherto, there are hardly any aseptic paper- or paperboard-based packages for long-term ambient storage of the above described kind available on the market, from a cost-efficient, non-foil packaging laminate, as compared to aluminium-foil laminates, that have a reliable level of barrier properties and food preservation properties for more than 3 months. There are some polymer materials that provide good barrier properties, but they either have the wrong mechanical properties in the laminate or are difficult to process in the converting into thin layers in laminates, e.g. requiring expensive co extruded tie layers, or, they may, moreover, be considerably more expensive at feasible thickness than aluminium and are, therefore, not cost-efficient for packaging of e.g. milk or juice.

There is one type of polymer gas barrier layers that could be very cost-efficient, i.e. barrier polymers that are coated in the form of a dispersion or solution in a liquid or solvent, onto a substrate, and subsequently dried into thin barrier coatings. It is, however, very important that the dispersion or solution is homogeneous and stable, to result in an even coating with uniform barrier properties. Examples of suitable polymers for aqueous compositions are polyvinyl alcohols (PVOH), water-dispersible ethylene vinyl alcohols (EVOH) or polysaccharide-based water-dispersible or dissolvable polymers. Such dispersion coated or so called liquid film coated (LFC) layers may be made very thin, down to tenths of a gram per $m^2$, and may provide high quality, homogenous layers, provided that the dispersion or solution is homogeneous and stable, i.e. well prepared and mixed. It has been known for many years that e.g. PVOH has excellent oxygen barrier properties under dry conditions. PVOH also provides very good odour barrier properties, i.e. capability to prevent odour substances from entering the packaging container from the surrounding environment, e.g. in a fridge or a storage room, which capability becomes important at long-term storage of packages. Furthermore, such liquid film coated polymer layers from water-dispersible or -dissolvable polymers often provide good internal adhesion to adjacent layers, which contributes to good integrity of the final packaging container. With package integrity is generally meant the package durability, i.e. the resistance to leakage of a packaging container. Such water dispersible barrier polymers have a major draw-back, however, in that they are generally sensitive to moisture and that the oxygen gas barrier properties deteriorate rapidly at high relative moisture content in the packaging laminate. Consequently, a thin dispersion coated layer of PVOH or EVOH or a similar polymer, may be suitable for packaging of dry products in a dry environment, but much less for packaging of liquids and wet products for long-term storage.

It has, therefore, previously been attempted to provide the moisture sensitive polymer layer with better initial oxygen barrier properties, as well as rendering it more moisture resistant, by modifying the polymer or including other substances in the polymer composition, i.a. by crosslinking the polymer. Such modifications and addition of substances, however, often make the process of liquid film coating more difficult to control and, importantly, more expensive. Such substances may also need careful screening in view of existing food safety legislations for food packaging. It has, for example, also been attempted to heat cure a dispersion coated PVOH layer in connection with the drying thereof, by heating it up to above 100° C. However, the heat exposure may damage the coated paperboard substrate and negatively influence the coating quality, for example by inducing defects, such as blisters and cracks in the oxygen barrier coating. Moreover, it has been realised that such attempts alone do not provide sufficient moisture resistance and robustness for keeping a sufficient level of oxygen barrier through the entire life of an aseptic package.

It was, thus, expected that in order to reach the required level of oxygen barrier properties in a final packaging container for aseptic, long-term storage, the liquid-film coatable gas barrier polymer binder, e.g. PVOH, would have to be improved by new means or at least by some of the expensive known modification methods, i.e. the addition of a crosslinking substance.

In addition, a packaging laminate for use in packaging containers for aseptic, long-term storage, needs to have water vapour barrier properties in itself, i.e. for the protection of the packaged food product.

It is important to understand that there is a difference between water vapour barrier and water vapour resistance of a layer. With water vapour or moisture resistance is meant the ability of a barrier layer to keep its barrier properties also when exposed to moisture, i.e. to withstand the negative influence of moisture on the properties of the polymer.

With water vapour barrier properties is meant the barrier against slowly migrating water vapour molecules through the material, i.e. not the ability to resist water or moisture in order to keep the properties of the material and not the immediate liquid barrier properties, which are preventing the material from getting wet in a short term perspective, i.e. immediately or almost immediately. As an example, heat sealable polyolefins, such as the preferred low density polyethylenes (LDPE's or LLDPE's), are liquid barriers and are suitable as outermost layers to protect the paperboard inside of a laminate against the filled liquid product or against wet conditions outside the package, such as at high humidity or chilled storage. Low density polyethylene has, however, comparably low water vapour barrier properties, i.e. actually very low capability at reasonable thickness, to withstand the long-term, slow migration of water vapour through the laminate during shipping and storage.

Water vapour barrier properties are important during long-term storage, also because they prevent moisture from a packaged liquid food product from escaping out of a packaging container, which could result in a lower content of liquid food product than expected in each packaging container, when finally opened by the consumer. Possibly, also the composition and the taste of the product could be altered by becoming more concentrated. Moreover, by preventing water vapour from migrating and escaping out of the packaged food product into the paper or paperboard layer, the packaging laminate will be able to keep its stiffness properties for a longer time. Thus, it is important that the packaging material also has sufficient water vapour barrier properties to be suitable for long-term aseptic packaging of liquid products.

The water dispersible or dissolvable barrier polymers suitable for liquid film coating or dispersion coating, generally have low resistance to water and moisture. They are easily loosing their oxygen barrier properties when exposed to moisture. They are not known to have water vapour resistance, unless they are crosslinked or modified in some way. When modified to obtain moisture resistance in order to maintain their gas barrier properties, normally they still do not obtain any notable water vapour barrier properties.

The conventional aluminium foil used today in commercial packaging containers for aseptic, liquid food, has both water vapour barrier properties and oxygen barrier properties. There are hardly any suitable, cost-efficient material alternatives providing both reliable oxygen barrier and water vapour barrier comparable to aluminium foil. Aluminium foil does, in fact, effectively prevent any molecules existing in the environment around the package or in the packaged product from migrating in any direction through the foil, as long as the aluminium foil layer is intact and undamaged.

There is a need, however, for a cost-efficient and robust, i.e. reliable also at moderate variations in manufacturing and handling conditions, non-aluminium foil based packaging material for aseptic, liquid food packaging, e.g. of milk or other beverage, which material provides sufficient total barrier properties in packaging containers for long-term aseptic storage, under ambient conditions. With the term "long-term storage" in connection with the present invention, is meant that the packaging container should be able to preserve the qualities of the packed food product, i.e. nutritional value, hygienic safety and taste, at ambient conditions for at least 3 months, preferably longer.

DISCLOSURE OF THE INVENTION

It is, therefore, an object of the present invention to overcome or alleviate the above-described problems in producing a non-foil paper or paperboard packaging laminate for long-term, aseptic packaging of liquid or wet food.

It is an object of the invention to provide a cost-efficient, non-foil paper- or paperboard-based packaging laminate having good gas barrier properties, good water vapour barrier properties and good internal adhesion properties for the purpose of manufacturing aseptic, gas-tight and water-vapour tight packaging containers, having good package integrity. With cost-efficient is of course meant relatively to paper-based packaging laminates having a barrier layer of aluminium foil, but also to other known attempts of providing non-foil packaging laminates.

It is a further object of the invention to provide a cost-efficient and robust, non-foil, paper- or paperboard-based and heat-sealable packaging laminate having good gas barrier properties, good water vapour barrier properties and good internal adhesion properties for the purpose of manufacturing aseptic packaging containers for long-term storage of liquid foods at maintained nutritional quality under ambient conditions.

A more specific object, according to at least some of the embodiments of the invention, is to provide a cost-efficient, non-foil, paper- or paperboard-based liquid packaging container having good gas and water vapour barrier properties, good odour barrier properties, and good integrity for aseptic packaging of milk, at long-term storage under ambient conditions.

These objects are thus attained according to the present invention by the laminated packaging material, the packaging container and the method of manufacturing the packaging material, as defined in the appended claims.

According to a first aspect of the invention, the general objects are attained by a non-foil packaging laminate comprising a core layer of paper or paperboard, a first outermost liquid tight, heat sealable polyolefin layer, a second innermost liquid tight, heat sealable polyolefin layer and, applied onto the inner side of the layer of paper or paperboard, an oxygen gas barrier layer formed by liquid film coating of a liquid gas barrier composition and subsequent drying, which liquid gas barrier composition comprises a polymer binder dispersed or dissolved in an aqueous or solvent-based medium wherein also inorganic particles are dispersed in the same medium, and wherein the packaging laminate further comprises a water vapour barrier layer, arranged between the applied oxygen gas barrier layer and the innermost heat sealable polyolefin layer, which water vapour barrier layer comprises a polyolefin-based polymer matrix with inorganic filler particles distributed therein.

The dispersible or dissolvable polymer binder to be used in the liquid film coated barrier according to the invention, is a polymer providing gas barrier properties when formed into a homogenously coated and dried layer.

Preferably, the dispersible or dissolvable polymer binder is selected from the group consisting of PVOH, water dispersible EVOH, polysaccharides such as for example starch or starch derivatives, water dispersible polyvinylidenechloride (PVDC) or water dispersible polyesters, or combinations of two or more thereof.

More preferably, the polymer binder is selected from the group consisting of PVOH, water dispersible EVOH, starch or starch derivatives, or combinations of two or more thereof.

In comparison with aluminium foil, PVOH as a liquid film coating barrier polymer enjoys many desirable properties, with the result that it is the most preferred barrier material in many contexts. Among these, mention might be made of the good film formation properties, compatibility with foods and economic value, together with its high oxygen gas barrier properties. In particular, PVOH provides a packaging laminate with high odour barrier properties, which is especially important for the packaging of milk.

Like many other conceivable barrier polymers such as, for example, starch or starch derivatives, polyvinyl alcohol is suitably applied by means of a liquid film coating process, i.e. in the form of an aqueous or solvent-based dispersion or solution which, on application, is spread out to a thin, uniform layer on the substrate and thereafter dried. We have found that one drawback in this process is, however, that the liquid polymer dispersion or polymer solution which is applied on a core layer of paper or paperboard may penetrate into the liquid-absorbing fibres of the core layer. There is a risk of pinholes being formed, depending on paperboard characteristics, if the applied layer is too thin, in connection with the removal of water or solvent for drying the applied barrier layer.

Aqueous systems generally have certain environmental advantages. Preferably, the liquid gas barrier composition is water-based, because such composition usually have a better work environment friendliness than solvent-based systems, as well.

As briefly mentioned above, it is known to include a polymer or compound with functional carboxylic acid groups, in order to improve the water resistance and oxygen barrier properties of a PVOH coating. Suitably, the polymer with functional carboxylic acid groups is selected from among ethylene acrylic acid copolymer (EAA) and ethylene methacrylic acid copolymers (EMAA) or mixtures thereof. An EAA copolymer may be included in the oxygen barrier layer in an amount of about 1-20 weight %, based on dry coating weight.

It is believed that the improved oxygen and water resistance properties result from an esterification reaction between the PVOH and the EAA at an increased drying temperature, whereby the PVOH is crosslinked by hydrophobic EAA polymer chains, which thereby are built into the structure of the PVOH. Such a mixture is, however, considerably more expensive because of the cost of the additives. Furthermore, drying and curing at elevated temperatures is not preferred because the risk of crack and blisters formation in a barrier coating onto a paperboard substrate. Crosslinking may also be induced by the presence of polyvalent compounds, e.g. metal compounds such as metal-oxides. However, such improved liquid film coated gas barrier layers still are not able to by itself provide a cost-efficient and well-formed packaging container with sufficient barrier properties for reliable, long-term aseptic packaging at ambient storage.

Alternatively, special kinds of water-dispersible ethylene vinyl alcohol polymer (EVOH) have lately been developed and may be conceivable for an oxygen barrier liquid coating composition, according to the invention. Conventional EVOH polymers, however, are normally intended for extrusion and are not possible to disperse/dissolve in an aqueous medium in order to produce a thin liquid film coated barrier film of 6 g/m2 or below, preferably 4 g/m2 or below. It is believed that the EVOH should comprise a rather high amount of vinyl alcohol monomer units to be water-dispersible or dissolvable and that the properties should be as close to those of liquid film coating grades of PVOH as possible. An extruded EVOH layer is not an alternative to liquid film coated EVOH, because it inherently has less similar properties to PVOH than EVOH grades intended for extrusion coating, and because it cannot be applied at a cost-efficient amount below 5 g/m2 as a single layer by extrusion coating or extrusion lamination, i.e. it requires co-extruded tie layers, which are generally very expensive polymers. Furthermore, very thin extruded layers cool off too quickly and do not contain enough heat energy to sustain sufficient lamination bonding to the adjacent layers.

Other examples of polymer binders providing oxygen barrier properties, suitable for liquid film coating, are the polysaccharides, in particular starch or starch derivatives, such as preferably oxidised starch, cationic starch and hydroxypropylated starch. Examples of such modified starches are hypochlorite oxidised potato starch (Raisamyl 306 from Raisio), hydroxypropylated corn starch (Cerestar 05773) etc. However, also other starch forms and derivatives are known to provide gas barrier properties at some level.

Further examples of polymer binders are gas barrier coatings comprising mixtures of carboxylic acid containing polymers, such as acrylic acid or methacrylic acid polymers, and polyalcoholic polymers, such as PVOH or starch, which are described for example in EP-A-608808, EP-A-1086981 and WO2005/037535. A cross-linking reaction of these polymer binders are preferred, as mentioned above, for resistance to high humidity.

Also mixtures with only a minor mixing ratio of one of the components and even compositions from the sole of these components do provide oxygen barrier properties in an aqueous coating composition.

Most preferably, however, the gas barrier polymer is PVOH, because it has all the good properties mentioned above, i.e. film formation properties, gas barrier properties, cost efficiency, food compatibility as well as, very importantly for the packaging of milk, odour barrier properties.

A PVOH-based gas barrier composition performs best when the PVOH has a degree of saponification of at least 98%, preferably at least 99%, although also PVOH with lower degrees of saponification will provide oxygen barrier properties.

It might be expected that by compounding mineral fillers into melt processed thermoplastic polymer layers, e.g. of normally water resistant polyolefin-based polymers, the slow migration of water vapour molecules through the layer may be reduced considerably. However, conventional mineral fillers, such as for example talcum or calcium carbonate, do not provide any significant oxygen barrier properties to such a layer.

When trying to protect a thin, liquid film coated barrier layer of e.g. PVOH, by laminating with a layer of melt extruded polyolefin having inorganic particles homogeneously distributed therein, it was seen that sufficient levels of oxygen barrier could not be maintained during long term storage conditions at reasonable layer thicknesses, although the PVOH layer initially provides quite good oxygen barrier properties to a laminate. Accordingly, it was concluded that neither oxygen barrier properties nor water vapour barrier properties were sufficient and that further layers and materials would be necessary in the laminate structure, which in turn would lead to a more expensive laminate than would be feasible to compete with corresponding aluminium-foil based packaging laminates.

Very surprisingly, however, when producing packaging containers by laminating a layer obtained from a liquid film coated PVOH barrier composition also containing inorganic particles, with another layer obtained from melt processing of a polyolefin-based polymer matrix with inorganic particles, it was found that not only sufficient oxygen barrier properties were achieved, but also that the water vapour barrier properties of the finished packaging laminate and, even, of the final package were surprisingly improved and well above sufficient. In fact, synergetic and surprisingly improved water vapour barrier properties were obtained by including fillers in both layers. Although some contribution from the inclusion of a filled polyolefin layer alone to the total water vapour barrier of a finished packaging laminate was obtained, sufficient and reliable water vapour barrier properties were not obtained until also, surprisingly, the PVOH layer comprised inorganic particles. Then, quite unexpectedly, the water vapour barrier was further improved by 40% over what was obtained from the filled polyolefin layer alone.

The contribution of the filled polyolefin layer to the overall oxygen barrier properties of the finished packaging laminate should have been zero, but the total long term oxygen transmission of the laminate was also unexpectedly improved compared to the completely insufficient values of oxygen transmission obtained and measured on the corresponding material not comprising inorganic particles in the liquid film coated, oxygen barrier layer.

This unexpected, synergetic effect is needed to be able to rely on such a packaging laminate also under extreme conditions, such as in very dry climate, because the moisture migration through the packaging container wall from the 100% wet inside packaged product towards the outside of the packaging container wall, will be higher when there is dry climate on the outside of the package. Due to the bigger difference in relative humidity (RH), the driving forces for moisture transport through the material of the packaging container wall will be much higher under dry desert climate conditions and therefore the total water vapour barrier properties of the packaging material need to be higher.

Thus, according to the invention, a cost-efficient laminate having all the required food preservation properties for long-term aseptic packaging of e.g. milk is achieved by combining paperboard with a liquid film coated oxygen barrier layer and a separate filled polyolefin-based layer on the inside thereof, wherein the liquid barrier composition additionally also comprises inorganic particles.

The polymer binder material of the dispersion or solution to be coated as a liquid film, is mixed with an inorganic compound which preferably is laminar in shape, or flake-formed. By the layered arrangement of the flake-shaped inorganic particles, an oxygen gas molecule has to migrate a longer way, via a tortuous path, through the oxygen barrier layer, than the normal straight path across a barrier layer.

Preferably, the inorganic laminar compound is a so-called nanoparticle or nanoclay compound dispersed to an exfoliated state, i.e. the lamellae of the layered inorganic compound are separated from each other by means of a liquid medium. Thus the layered compound preferably may be swollen or cloven by the polymer dispersion or solution, which at dispersion has penetrated the layered structure of the inorganic material. It may also be swollen by a solvent before added to the polymer solution or polymer dispersion. Thus, the inorganic laminar compound is dispersed to a delaminated state in the liquid gas barrier composition and in the dried barrier layer. The term clay minerals includes minerals of the kaolinite, antigorite, smectite, vermiculite, bentonite or mica type, respectively. Specifically, laponite, kaolinite, dickite, nacrite, halloysite, antigorite, chrysotile, pyrophyllite, montmorillonite, hectorite, saponite, sauconite, sodium tetrasilicic mica, sodium taeniolite, commonmica, margarite, vermiculite, phlogopite, xanthophyllite and the like may be mentioned as suitable clay minerals. Especially preferred nano-particles are those of montmorillonite, most preferred purified montmorillonite or sodium-exchanged montmorillonite (Na-MMT). The nano-sized inorganic laminar compound or clay mineral preferably has an aspect ratio of 50-5000 and a particle size of up to about 5 μm in the exfoliated state.

Preferably, the inorganic particles mainly consist of such laminar bentonite particles having an aspect ratio of from 50 to 5000.

Preferably, the liquid film coated oxygen barrier layer includes from about 5 to about 40 weight %, more preferably from about 10 to about 40 weight % and most preferably from about 20 to about 30 weight %, of the inorganic laminar compound based on dry coating weight. If the amount is too low, the barrier properties of the coated and dried barrier layer will not be markedly improved compared to when no inorganic laminar compound is used. If the amount is too high, the liquid composition will become more difficult to apply as a coating and more difficult to handle in storage tanks and conduits of the applicator system. Preferably, the barrier layer includes from about 99 to about 60 weight %, more preferably from about 99 to about 70 weight % and most preferably from about 95 to about 80 weight % of the polymer based on the dry coating weight. An additive, such as a dispersion stabiliser or the like, may be included in the gas barrier composition, preferably in an amount of not more than about 1 weight % based on the dry coating. The total dry content of the composition is preferably from 5 to 15 weight-%, more preferably from 7 to 12 weight-%.

According to an alternatively preferred embodiment, the inorganic particles mainly consist of laminar talcum particles having an aspect ratio of from 10 to 500. Preferably, the composition comprises an amount of from 10 to 70 weight-%, more preferably from 20 to 60 weight-%, most preferably 30-50 weight-%, of the talcum particles, based on dry weight. Below 20 weight-%, there is no significant increase in gas barrier properties, while above 70 weight-%, the coated layer may be more brittle and breakable because there is less internal cohesion between the particles in the layer. The polymer binder seems to be in too low amount to surround and disperse the particles and laminate them to each other within the layer. The total dry content of such a liquid barrier composition from PVOH and talcum particles may be between 5 and 25 weight-%.

It is also known from WO03/031720 hereby incorporated by reference, that surprisingly good oxygen barrier properties may be achieved when there is made use of colloidal silica particles, exhibiting a particle size of 3-150 nm, preferably 4-100 nm and even more preferred 5-70 nm, which particles are preferably amorphous and spherical. The use of colloidal silica particles moreover has the advantage that the liquid barrier composition may be applied at a dry content of 15-40 weight %, preferably 20-35 weight % and even more preferred 24-31 weight %, whereby the demand on forcible drying is decreased.

Alternative, inorganic particles according to the invention are particles of kaolin, mica, calcium carbonate etc.

The preferred polymer binder, also when employing inorganic particles for providing oxygen barrier properties, is PVOH, partly due to its advantageous properties mentioned above. In addition, PVOH is advantageous from a mixing point of view, i.e. it is generally easy to disperse or exfoliate inorganic particles in an aqueous solution of PVOH to form a stable mixture of PVOH and particles, thus enabling a good coated film with a homogeneous composition and morphology.

Preferably, according to the invention, the said oxygen gas barrier layer is applied at a total amount of from 0.5 to 6 $g/m^2$, preferably from 3 to 5 $g/m^2$, more preferably from 3 to 4 $g/m^2$, dry weight. Below 1 $g/m^2$, too low gas barrier properties will be achieved, while above 6 $g/m^2$, the coated layer will not bring cost-efficiency to the packaging laminate, due to high cost of barrier polymers in general and due to high energy cost for evaporating off the liquid. Furthermore, the coated layer may become too brittle at a higher thickness than 6 g/m2, depending on how much of the inorganic particles is included in the gas barrier composition. A more preferred level of oxygen barrier is achieved at from 3 to 5 $g/m^2$ and a most preferred balance between barrier properties and costs is achieved between 3 and 4 $g/m^2$.

According to a preferred embodiment of the invention, the oxygen gas barrier layer is applied in two consecutive steps with intermediate drying, as two part-layers. When applied as two part-layers, each layer is suitably applied in amounts from 1.0 to 3.0 $g/m^2$, preferably from 1.5 to 2.0 $g/m^2$, and allows a higher quality total layer from a lower amount of liquid gas barrier composition.

It is preferred according to the invention that the oxygen gas barrier layer is coated and applied directly onto and adjacent, i.e. contiguous to, the core layer of paper or paperboard. The paper layer ensures that moisture migrating outwards through the laminated packaging material is not trapped in the moisture sensitive liquid film coated oxygen gas barrier layer, but further transported via the paper layer towards the outside of the packaging container. The paper layer breathes away the humidity from the adjacent barrier layer and keeps the moisture content within the barrier layer at an almost constant low level for a long time.

A paper or paperboard core layer for use in the invention usually has a thickness of from about 100 µm up to about 600 µm, and a surface weight of approximately 100-500 g/m2, preferably about 200-300 g/m2, and may be a conventional paper or paperboard of suitable packaging quality.

For low-cost aseptic, long-term packaging of liquid food, a thinner packaging laminate may be used, having a thinner paper core layer. The packaging containers made from such packaging laminates are not fold-formed and more similar to pillow-shaped flexible pouches. A suitable paper for such pouch-packages usually has a surface weight of from about 50 to about 140 g/m2, preferably from about 70 to about 120 g/m2, more preferably from 70 to about 110 g/m2.

Suitable polyolefin-based matrix polymers for the water vapour barrier layer according to the invention are those based on, comprising or preferably consisting of high density polyethylene (HDPE). Optimal water vapour barrier properties in combination with other required package properties are obtained when using a matrix composition consisting of HDPE and inorganic filler particles dispersed homogeneously within the matrix polymer. However, also other polyolefins such as polyethylene (LDPE, MDPE) and polypropylene (PP), and copolymers or blends thereof, are feasible matrix polymers within the scope of the invention. It is, however, preferred according to the invention that the matrix polymer mainly comprises HDPE or is based on HDPE. Most preferably, the matrix polymer consists of HDPE.

The inorganic filler used according to the invention is preferably laminar in shape and configuration, in order to provide the best possible water vapour barrier properties. Examples of such laminar filler particles are talcum, mica and nano-sized clay particles, e.g. monmorillonite, smectite, bentonite etc. Most preferred are laminar talcum particles. However, also other inorganic filler particles, such as kaolin, calcium carbonate, dolomite and others, may work sufficiently well when used in high amounts (preferably more than 50 weight-%).

The water vapour barrier layer advantageously has a thickness of from 15 to 30 µm, preferably from 15 to 25 µm, most preferably from µm $g/m^2$.

According to an alternative embodiment of the invention, the water vapour barrier layer, comprising a polyolefin-based matrix polymer and inorganic filler particles, is co-extruded by means of micro-multilayer co-extrusion technology, with a tougher or more shock absorbing polymer, relative to the filled polyolefin, such that the water vapour barrier layer consists of several thin alternating layers of filled polyolefin and tough or shock absorbing polymer. In this way, both water vapour barrier properties of the filled polyolefin layers are kept, while the shock absorbing alternating layers also provide some toughness to the co-extruded film. The inherent brittleness of the filled polyolefin layers is thus compensated with the shock absorbing properties provided by the alternating layers of shock absorbing polymers. Such tougher polymers may be found among the LLDPE polymers and shock absorbing polymers are selected from a group consisting of m-LLDPE (metallocene-catalyst polymerised Linear Low Density Polyethylene), VLDPE (Very Low Density Polyethylene), ULDPE (Ultra Low Density Polyethylene) and melt extrudable grades of elastomers, plastomers and TPE (Thermoplastic Elastomers).

In micro-multilayer co-extrusion technology, a so-called multiplier feed-block is utilised, which divides the flows of the two different polymers into multiple micrometer-thin, alternating layers, thus forming a film of thin alternating polymer layers. In doing so, a film comprising two different polymers may be tailor-made and optimised regarding layer thicknesses and the desired properties. Suitably, the micro-multilayer co-extruded water vapour barrier film has a thickness of from 10 to 20 µm.

In order to increase the light barrier of the packaging laminate, if needed, black, light-absorbing pigments may be blended into one of the polymers, while white, light-reflecting pigments are blended into the other polymers of the micro-multilayer co-extruded layers. The pre-manufactured micro-multilayer film obtains thus a greyish appearance.

Suitable thermoplastics for the outermost and innermost heat sealable liquid-tight layers are polyolefins, preferably polyethylenes and most preferably low density polyethylenes such as, for example LDPE, linear LDPE (LLDPE) or single site catalyst metallocene polyethylenes (m-LLDPE) or copolymers or blends thereof. The thickness of the innermost heat sealable polyolefin layer is from 10 to 30 µm.

Preferably, the water vapour barrier layer is bonded to the paper or paperboard layer by an intermediate thermoplastic polymer layer selected from polyolefins and polyolefin-based adhesive polymers, especially LDPE or a polyethylene-based adhesive polymer. The thickness of the intermediate thermoplastic bonding layer is preferably from 10 to 20, preferably from 12 to 15 μm.

In order to further improve the light barrier of a packaging laminate according to the invention, if necessary, light absorbing particles or pigments may be blended into the intermediate thermoplastic bonding layer. A preferred example of such light absorbing particles is "carbon black". The black colour of the intermediate bonding layer is then advantageously hidden towards the outside by the paperboard layer, and covered towards the inner side of the laminate, by the water vapour barrier layer.

According to an alternatively preferred embodiment, the intermediate thermoplastic bonding layer comprises instead or additionally inorganic particles in the form of light reflecting, white pigments to improve the light barrier properties of the packaging laminate.

According to a further aspect of the invention, there is provided a packaging container suitable for long-term aseptic packaging manufactured from the packaging laminate of the invention, having properties such as low oxygen and water vapour permeation rates, package integrity and internal adhesion between laminate layers, which properties are comparable to those of conventional, commercially available, aluminium foil packaging containers, as set out in appended claim 19. According to yet a further aspect of the invention, there is provided a method for manufacturing of the packaging laminate as defined in claims 13-18.

Thus, the method comprises the steps of providing a layer of paper or paperboard, providing a liquid gas barrier composition containing a polymer binder dispersed or dissolved in a liquid, aqueous or solvent-based medium, and further containing inorganic particles dispersed in the composition, forming a thin oxygen gas barrier layer comprising said polymer binder and inorganic particles by coating the liquid composition as a film onto a first side of said layer of paper or paperboard and subsequently drying to evaporate the liquid, providing a melt processable polymer composition comprising a polyolefin-based polymer matrix and inorganic filler particles distributed therein, providing a water vapour barrier layer from the melt processable polymer composition by a melt extrusion method, laminating the extruded water vapour barrier layer to the inner side of the oxygen gas barrier layer, providing an innermost layer of a heat sealable polyolefin on the inside of the water vapour barrier layer and providing an outermost layer of a heat sealable polyolefin on the outside of the core layer.

In a preferred method of the invention, the liquid gas barrier composition is coated directly onto the inner side of the layer of paper or paperboard. Because the packaged food product is, or contains, a liquid, there is a constant transport of water vapour through the laminate from the inside to the outside, why it is better to allow the water vapour to escape outwards through the liquid film coated layer and continue outwards rather quickly through the paper layer. If the paper layer is coated by a layer of polymer, the water vapour is kept and trapped for a longer time on the inside of the paper layer and raising the relative humidity in the liquid film coated barrier layer. It is thus preferred that the liquid film coated layer is directly adjacent the paper layer.

According to a preferred method of the invention, the oxygen gas barrier layer is applied in a total amount of from 0.5 to 6 g/m$^2$, preferably from 3 to 5 g/m$^2$, more preferably from 3 to 4 g/m$^2$, dry weight. According to a further preferred method of the invention, the oxygen gas barrier layer is applied as two part-layers in two subsequent steps with intermediate drying. When applied as two part-layers, each layer is applied in amounts from 1.0 to 3.0 g/m$^2$, preferably from 1.5 to 2 g/m$^2$.

According to one embodiment, the water vapour barrier layer of the melt processable polymer composition is provided and laminated to the inner side of the oxygen gas barrier layer, by means of extrusion coating or co-extrusion coating onto the coated paperboard.

According to an alternative embodiment of the invention, the water vapour barrier layer of the melt processable polymer composition is provided by extrusion or co-extrusion casting or blowing of a film, which is subsequently laminated to the inner side of the oxygen gas barrier layer, by means of extrusion laminating with an intermediate thermoplastic bonding layer.

According to a further alternative embodiment of the invention, the method further comprises the steps of liquid film coating of an intermediate polymer bonding layer onto the applied oxygen gas barrier layer and drying it by evaporating the liquid, providing a water vapour barrier film from the melt processable polymer composition by means of extrusion or co-extrusion casting or blowing and then laminating the film to the inner side of the oxygen gas barrier layer by means of heat-pressure laminating it to the intermediate polymer bonding layer. The polymer of the intermediate bonding layer may be a thermoplastic bonding polymer or a curing adhesive polymer, e.g. an EB-curable adhesive polymer.

Such a pre-manufactured film may alternatively be produced by means of micro-multilayer co-extrusion technology, as explained above.

According to a preferred embodiment of the invention, innermost layer(s) of a heat sealable polyolefin is provided on the inside of the water vapour barrier layer by means of (co-) extrusion coating. The innermost heat sealable material may be divided into two or more part-layers, each comprising the same or different polyolefin, preferably low density polyethylene, in order to suit the intended heat sealing process. Alternatively, the innermost layer(s) of a heat sealable polyolefin are provided on the inside of the water vapour barrier layer by being co-extrusion formed in the same step and together with the water vapour barrier layer.

According to one rational, alternative embodiment, all the thermoplastic inside layers, including the intermediate bonding layer, the water vapour barrier layer and the innermost heat sealing layer(s), may be co-extrusion coated onto the liquid-film coated paperboard.

Preferably, the water vapour barrier layer is bonded to the barrier-coated paper or paperboard layer by an intermediate thermoplastic polymer layer selected from polyolefins and polyolefin-based adhesive polymers.

For the alternative method involving heat-pressure lamination, the intermediate liquid film coated bonding layer is advantageously an adhesive polymer, such as polyolefin-based copolymers or graft copolymers with (meth)acrylic acid or maleic anhydride monomer units.

Thus, preferably, the method of the invention further comprises the step of extrusion laminating the water vapour barrier layer to the inner side of the oxygen gas barrier layer, by means of an intermediate thermoplastic bonding layer. The oxygen barrier performance of the liquid film coated oxygen barrier layer is significantly improved when it is coated with or laminated to an adjacent layer of thermoplastic polymer, and such a layer also contributes to an increased overall abuse resistance of the packaging laminate. Preferably, such intermediate thermoplastic bonding layers are selected among polyolefins and polyolefin-based polymers. The intermediate thermoplastic bonding layer is advantageously a conventional LDPE.

EXAMPLES AND DESCRIPTION OF PREFERRED EMBODIMENTS

Figure 1B:
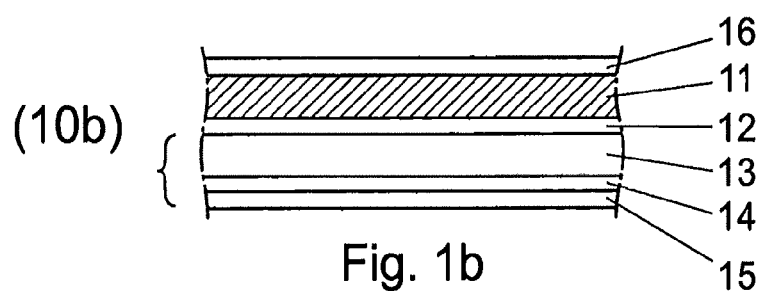
Figure 1C:
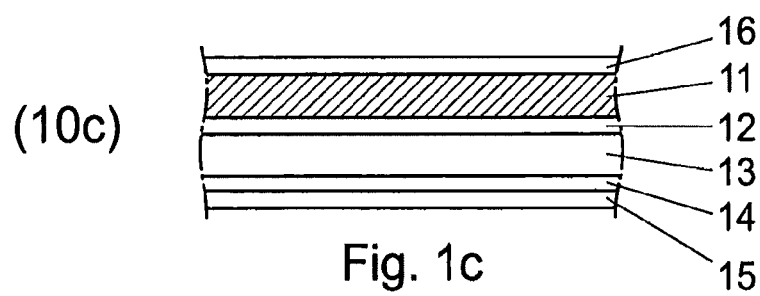
Figure 1D:
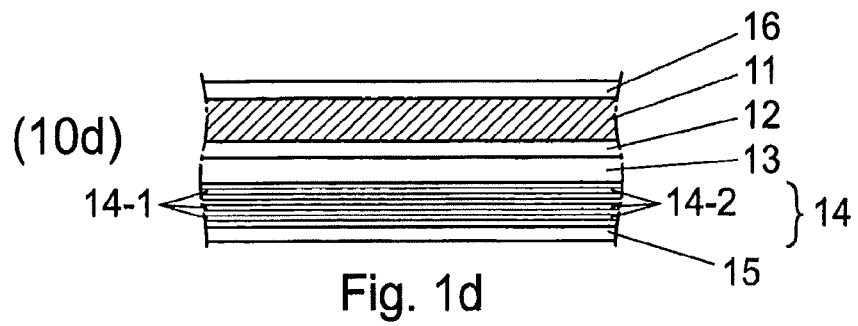
Figures 1, 2:
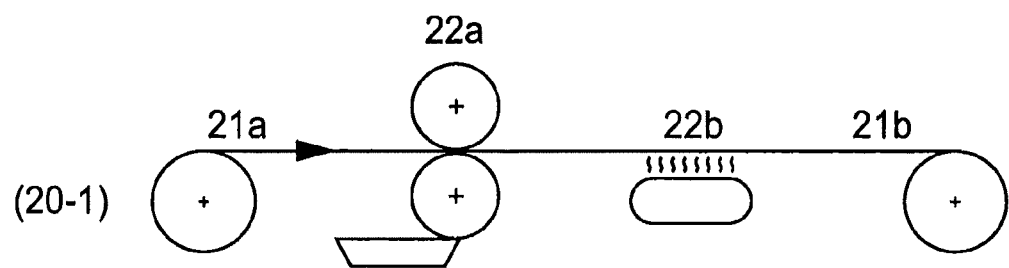
Figure 2A:
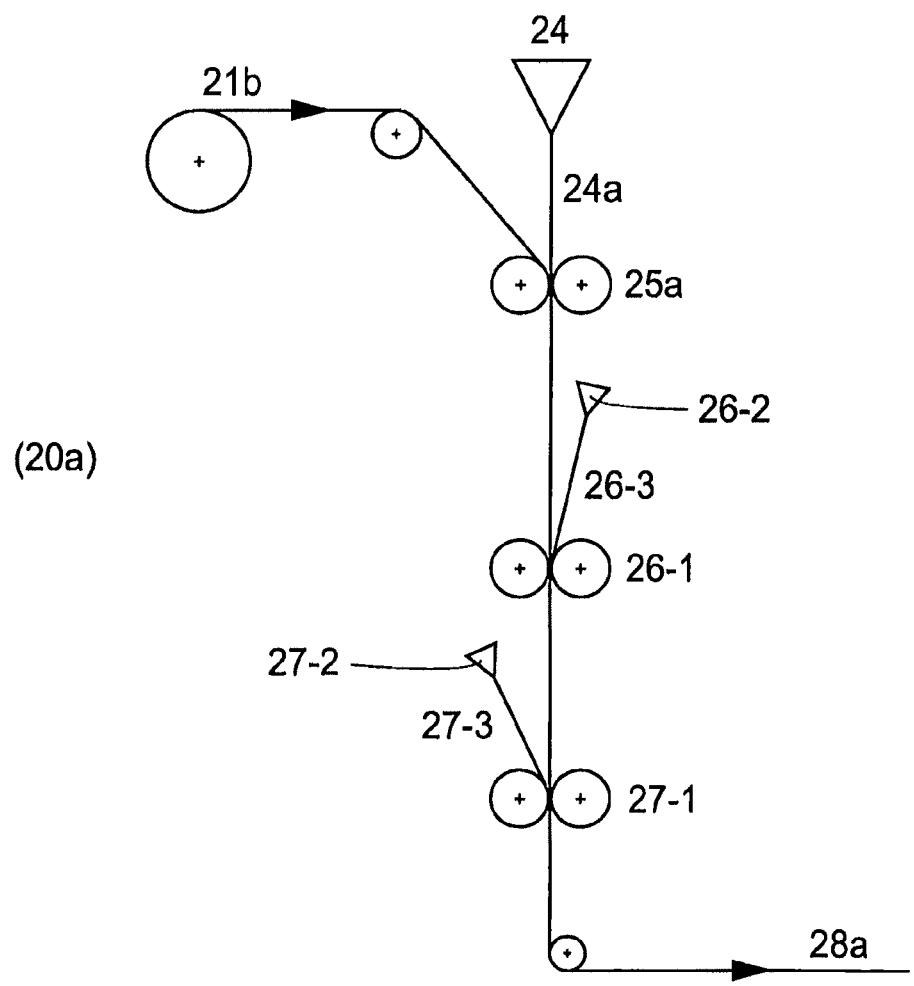
Figure 2B:
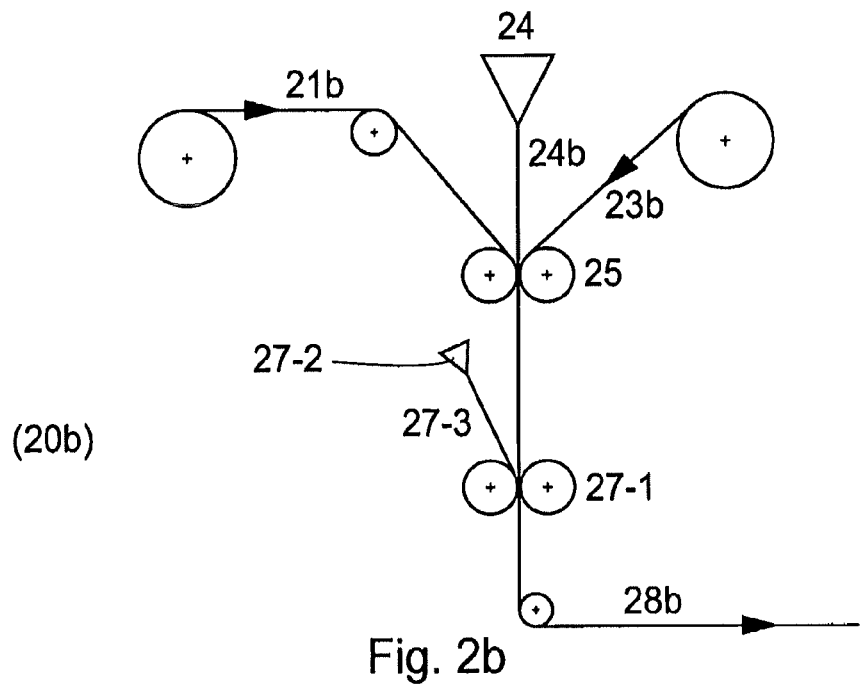
Figure 2C:
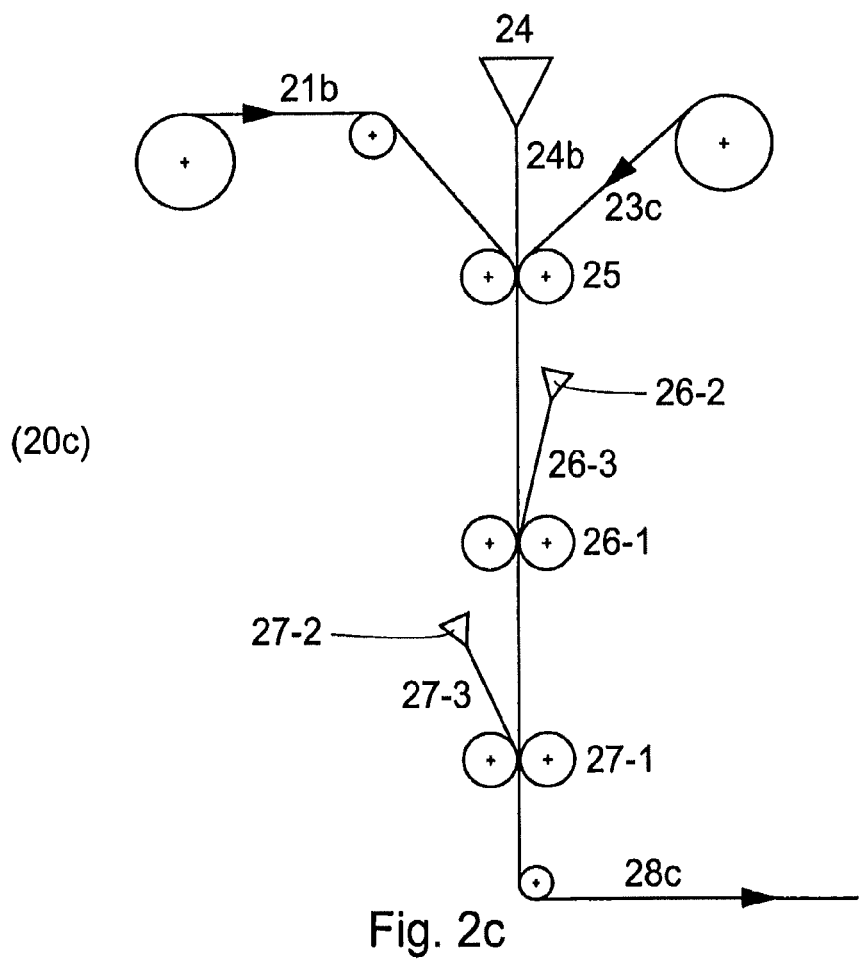
Figure 3A:
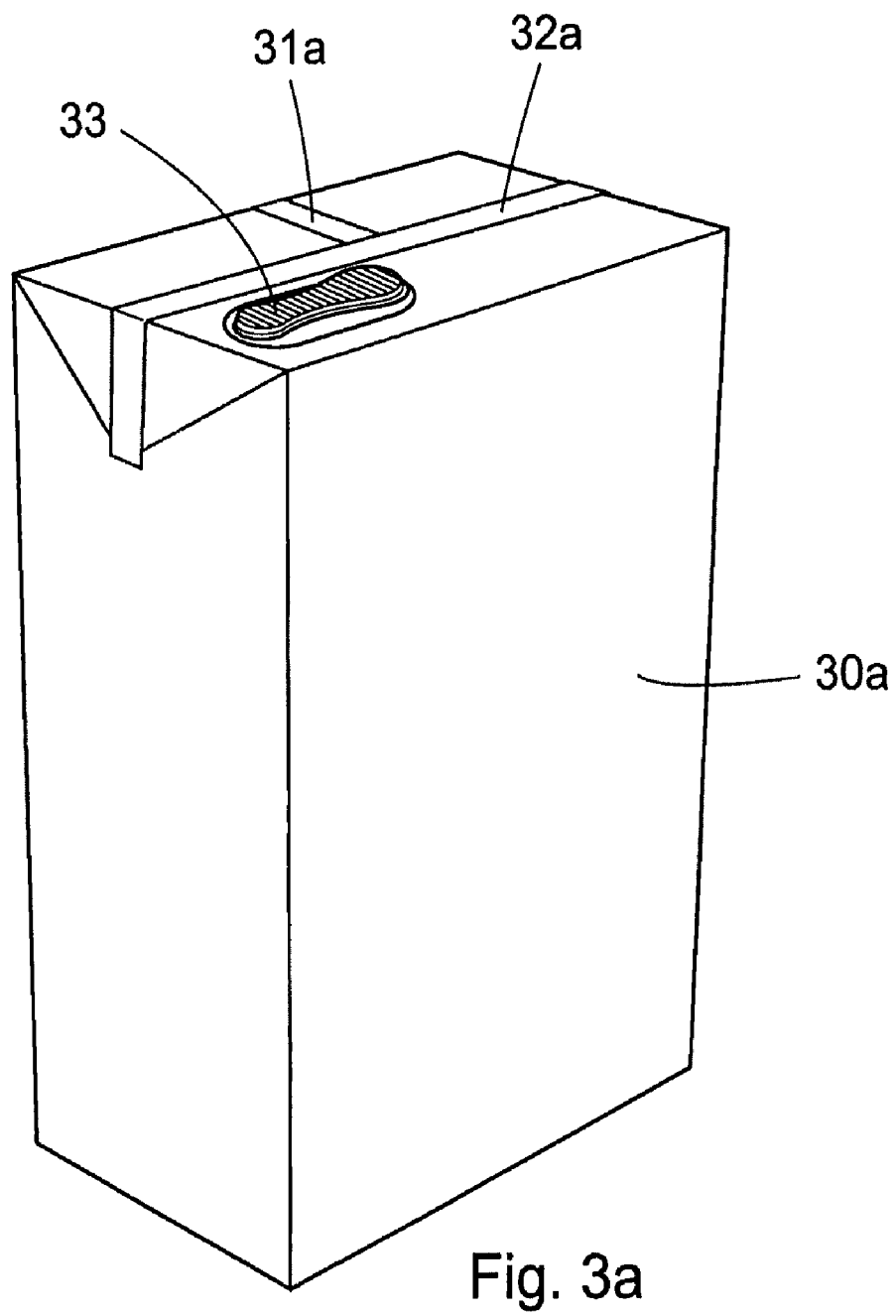
Figure 3B:
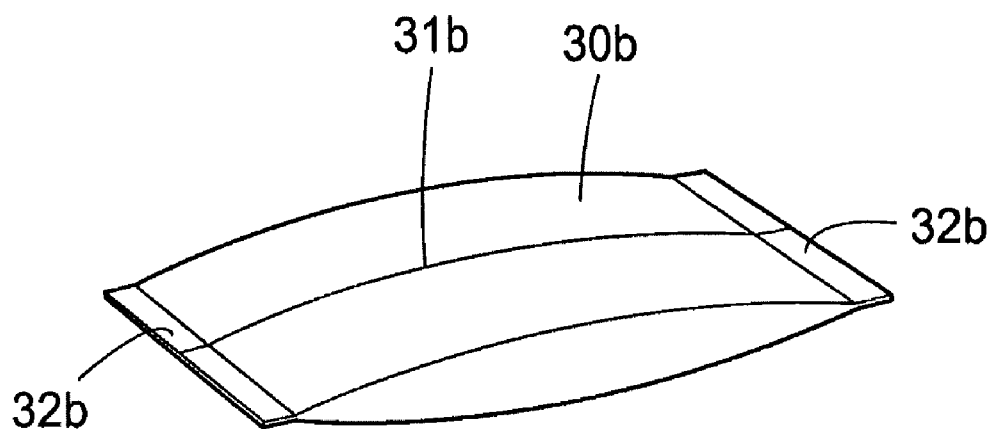
Figure 4:
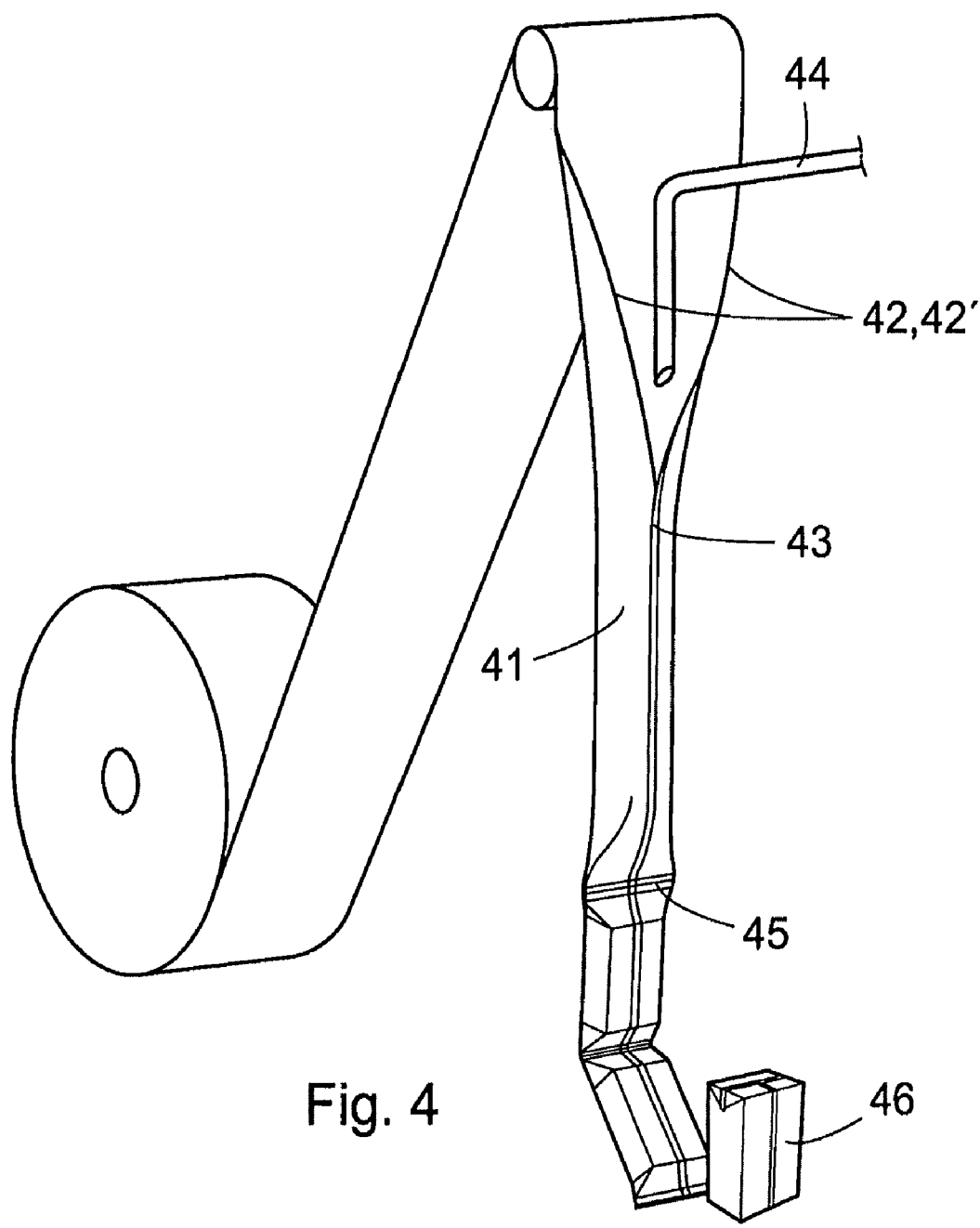

In the following, preferred embodiments of the invention will be described with reference to the drawings, of which:

FIGS. 1a, 1b, 1c and 1d are schematically showing, in cross-section, four alternative embodiments of a packaging laminate produced according to the invention, FIGS. 2-1, 2a, 2b and 2c are showing methods of manufacturing the packaging laminates described in FIGS. 1a, 1b and 1c/1d, respectively, FIGS. 3a and 3b are showing examples of packaging containers produced from the packaging laminate according to the invention, and FIG. 4 is showing the principle of how such packaging containers are manufactured from the packaging laminate in a continuous form, fill and seal process.

In FIG. 1a, there is shown, in cross-section, a first embodiment of a packaging laminate 10a for aseptic packaging and long-term storage under ambient conditions, produced according to the invention. The laminate comprises a paperboard core layer 11, having a bending force of 320 mN, and a thin oxygen gas barrier layer 12 formed by liquid film coating of a liquid gas barrier composition, and subsequent drying, onto the paperboard layer 11. The oxygen gas barrier composition comprises an aqueous solution of PVOH and a dispersion of inorganic laminar particles, in particular exfoliated bentonite clay at 30 weight-% based on dry weight, and after drying, the coated layer thus comprises PVOH with the flake-formed or laminar particles distributed in a layered manner within the PVOH continuous phase. The packaging laminate further comprises a water vapour barrier layer 14, arranged between said applied oxygen gas barrier layer 12 and an innermost heat sealable polyolefin layer 15, which water vapour barrier layer 14 comprises a polyolefin-based matrix polymer and inorganic filler particles distributed within the matrix polymer. The water vapour barrier layer 14 is laminated to the liquid film coated core layer 11-12, by direct extrusion or co-extrusion coating of the polyolefin-based polymer matrix composition, being a high density polyethylene (HDPE) composition with inorganic filler particles. The layer 14 may be co-extrusion coated onto the core layer together with an intermediate tie layer of an adhesive polyolefin-based polymer (not shown). An outer liquid tight and heat sealable layer 16 of polyolefin is applied on the outside of the core layer 11, which side is to be directed towards the outside of a packaging container produced from the packaging laminate. The polyolefin of the outer layer 16 is a conventional low density polyethylene (LDPE) of a heat sealable quality. An innermost liquid tight and heat sealable layer 15 is arranged on the inside of the water vapour barrier layer 14, which is to be directed towards the inside of a packaging container produced from the packaging laminate, and the layer 15 will be in contact with the packaged product. The innermost heat sealable layer may comprise LDPE and a linear low density polyethylene (LLDPE), preferably being an LLDPE produced by polymerising an ethylene monomer with a C4-C8, more preferably a C6-C8, alpha-olefin alkylene monomer in the presence of a metallocene catalyst, i.e. a so called metallocene-LLDPE (m-LLDPE). The innermost heat sealable layer 15 may consist of two or several part-layers comprising the same or different kinds of LDPE's, (m-)LLDPE's, or blends thereof, and may be co-extrusion coated together with the water vapour barrier layer 14 or extrusion coated onto the water vapour barrier layer 14 in a subsequent extrusion-coating step. The grammage thickness of the heat sealable layer 15 is about 15 g/m². The thickness of the water vapour barrier layer is preferably about 20 g/m². The thickness of the intermediate bonding layer is preferably from 10 to 15 g/m².

FIG. 1b shows a similar packaging laminate 10b as described in FIG. 1a, with the difference that the water vapour barrier layer 14, comprising a polyolefin-based matrix polymer and inorganic filler particles distributed within the matrix polymer, is part of a pre-manufactured film, which has been laminated to the oxygen-barrier coated paperboard layer. The water vapour barrier layer 14 is pre-manufactured together with the innermost heat sealable layer 15, by a melt co-extrusion process, such as co-extrusion film blowing or co-extrusion film casting, resulting in a multilayer film 14-15. The multilayer film 14-15 is then laminated to the liquid film coated barrier layer 12, by an intermediate layer 13 of a polyolefin-based polymer, preferably a low density polyethylene (LDPE). The intermediate bonding layer 13 is thus formed by extrusion laminating the oxygen barrier coated core layer 11-12 and the water vapour barrier, heat sealable film 14-15 to each other. The thickness of the intermediate bonding layer is preferably from 10 to 20 μm and the thickness of the water-vapour barrier, heat sealable film is from 15 to 35 μm.

FIG. 1c shows a similar packaging laminate 10c as described in FIG. 1b, i.e. the vapour barrier layer 14, comprising a polyolefin-based matrix polymer and inorganic filler particles distributed within the matrix polymer, is a pre-manufactured film, which is laminated to the oxygen-barrier coated paperboard layer. The difference compared to FIG. 1b, is that the water vapour barrier layer 14 is pre-manufactured as a single layer film, by a melt extrusion process, such as extrusion film blowing or extrusion film casting, resulting in a film 14. The film 14 is laminated to the liquid film coated barrier layer 12, by an intermediate layer 13 of a polyolefin-based polymer, preferably a low density polyethylene (LDPE). The intermediate bonding layer 13 is thus formed by extrusion laminating the oxygen barrier coated core layer 11-12 and the water vapour barrier film 14 to each other. A heat sealable polymer layer 15 is subsequently extrusion-coated onto the inner side of the water vapour barrier layer 14.

The grammage thickness of the heat sealable layer 15 is about 15 g/m². The thickness of the water vapour barrier layer is preferably about 20 g/m². The thickness of the intermediate bonding layer is preferably from 10 to 15 g/m².

FIG. 1d shows a similar packaging laminate 10d as described in FIG. 1c, but with the vapour barrier layer pre-manufactured film 14, comprising multiple, micrometer-thin, alternating layers of the polyolefin-based matrix polymer with inorganic filler (14-1) and layers of a tougher or more shock absorbing polymer (14-2), such as for example LLDPE, m-LLDPE, VLDPE or ULDPE. The micro-multilayer film 14 is laminated to the liquid film coated barrier layer 12, by an intermediate layer 13 of a polyolefin-based polymer, preferably a low density polyethylene (LDPE). The intermediate bonding layer 13 is thus formed by extrusion laminating the oxygen barrier coated core layer 11-12 and the water vapour barrier film 14 to each other. On the inside of the water vapour barrier film 14, is co-extrusion coated an innermost layer 15 of a heat sealable polymer, preferably LDPE.

In FIG. 2-1, the method of liquid film coating of the liquid oxygen barrier composition onto the paper or paperboard layer, as shown with layers 11 and 12 in the packaging laminates of FIGS. 1a, 1b, 1c and 1d, is schematically shown. The paper layer 21a is fed from a storage reel towards a liquid film coating station 22a, where the liquid gas barrier composition is applied at an amount such that the amount of coated and dried layer is about 1-6 g/m2, when the coated paper has passed the drying station 22b. According to one preferred embodiment, the liquid film coating operation is carried out in two steps, i.e. by first coating 1.0-3.0 g/m2, drying in an intermediate step and then coating a second time at 1.0-3.0 g/m2 and finally drying the total liquid film coated layer to obtain an oxygen barrier coated paper layer 21b.

In FIG. 2a, the lamination process 20a, for the manufacturing of the packaging laminate 10a of FIG. 1a, is shown, wherein the oxygen barrier coated layer 21b is directly co-extrusion coated by a multilayer melt film 24a, comprising a tie layer for bonding to the layer 21b and a water vapour barrier layer 14 adjacent to each other, the water vapour barrier layer 14 comprising a polyolefin-based matrix polymer, being HDPE, and inorganic filler particles, being talcum, distributed within the matrix polymer. In a subsequent extrusion coating step 26, an innermost liquid tight and heat sealable layer 15 of low density polyethylene is further extrusion coated onto the water vapour barrier layer 14. The innermost layer or layers 15 are fed through a feedblock 26-2 and applied as a melt curtain film 26-3 onto the water vapour barrier layer 14 in a roller nip station 26-1. Alternatively, extrusion coating of the innermost heat sealable layer(s) is carried out together with the water vapour barrier layer 14, whereby the multilayer melt film 24a may also comprise a co-extruded innermost liquid tight and heat sealable layer 15 on the inner side of the water vapour barrier layer 14. Thus, the shown extrusion coating station 26-1 may be omitted. Subsequently, the laminated paper and film passes a second extruder feedblock 27-2 and lamination nip 27-1, where an outermost heat sealable layer of LDPE 16 is coated onto the outer side of the paper layer. Finally, the finished packaging laminate 28a is wound onto a storage reel, not shown.

In FIG. 2b, the lamination process 20b is shown, for the manufacturing of the packaging laminate 10b of FIG. 1b, wherein the oxygen barrier coated core layer 21b is laminated to a pre-manufactured multilayer polymer film 23b, comprising a water vapour barrier layer 14 of a polyolefin-based polymer, preferably HDPE, with inorganic particles distributed therein, by extruding an intermediate bonding layer of LDPE 24b from an extrusion station 24 and pressing together in a roller nip 25. The pre-manufactured polymer film 23b further comprises an innermost liquid tight and heat sealable layer 15 arranged on the inner side of the water vapour barrier layer 14, to be directed towards the inside of a finished packaging container, the two layers 14 and 15 having been co-extrusion melt processed together in a co-extrusion film blowing method or in a co-extrusion film casting method. Subsequently, the laminated paper core 11-12 and multilayer film 14-15 passes a second extruder feedblock 27-2 and a lamination nip 27-1, where an outermost heat sealable layer of LDPE 16; 27-3 is coated onto the outer side of the paper layer. Finally, the finished packaging laminate 28b is wound onto a storage reel, not shown.

In FIG. 2c, the lamination process 20c is shown, for the manufacturing of the packaging laminate 10c of FIG. 1bc, being the same as the lamination process of FIG. 2b above, except that the innermost liquid tight and heat sealable layer (s) 15 is (co-)extrusion coated onto the pre-manufactured and laminated polymer film 23c in a separate step. Accordingly, the oxygen barrier coated layer 21b is laminated to a polymer film 23c, comprising a layer of a polyolefin-based polymer, preferably HDPE, with inorganic particles distributed therein, by extruding an intermediate bonding layer of LDPE 24b (or 24c) from an extrusion station 24 and pressing together in a roller nip 25. Subsequently, the laminated paper and film passes a second extruder feedblock 26-2 and a lamination nip 26-1, where an innermost heat sealable layer 15; 26-3 is coated onto the film side 23 of the laminate. Finally, the laminated paper and film passes a third extruder feedblock 27-2 and a lamination nip 27-1, where an outermost heat sealable layer of LDPE 16; 27-3 is coated onto the outer side of the paper layer. The finished packaging laminate 28c is finally wound onto a storage reel, not shown.

For the manufacturing of the alternative packaging laminate 1d, the same lamination process as shown in FIG. 2c is used, the difference being that the pre-manufactured film 14 is a film made by micro-multilayer co-extrusion technology as described above in connection with FIG. 1d.

FIG. 3a shows a preferred example of a packaging container 30a produced from the packaging laminate 10(a,b,c) according to the invention. The packaging container is particularly suitable for beverages, sauces, soups or the like. Typically, such a package has a volume of about 100 to 1000 ml. It may be of any configuration, but is preferably brick-shaped, having longitudinal and transversal seals 31 and 32, respectively, and optionally an opening device 33. In another embodiment, not shown, the packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the half-folded packaging container is still is easy to handle and dimensionally stable when put on a shelf in the food store or on a table or the like.

FIG. 3b shows an alternative, preferred example of a packaging container 30b produced from a packaging laminate 10'(a,b,c) having a thinner paper core layer and being according to the invention. Since the packaging laminate 10' is thinner by having a thinner paper core layer, it is not dimensionally stable enough to form a parallellepipedic or wedge-shaped packaging container, and is not fold formed after transversal sealing 32b. It will thus remain a pillow-shaped pouch-like container and distributed and sold like this.

FIG. 4 shows the principle as described in the introduction of the present application, i.e. a web of packaging material is formed into a tube 41 by the longitudinal edges 42, 42' of the web being united to one another in an overlap joint 43. The tube is filled 44 with the intended liquid food product and is divided into individual packages by repeated transversal seals 45 of the tube at a pre-determined distance from one another below the level of the filled contents in the tube. The packages 46 are separated by incisions in the transversal seals and are given the desired geometric configuration by fold formation along prepared crease lines in the material.

Example 1

A packaging laminate was produced by liquid film coating of 2×1 g/m2 of an aqueous gas barrier composition of dissolved and dispersed PVOH and 30 weight-% bentonite clay, calculated on dry matter, in two consecutive steps with drying in between, onto a 320 mN CLC/C paperboard from Frövi.

Preparation of the aqueous gas barrier composition: An aqueous dispersion of from about 5-15 weight-% of exfoliated laminar montmorillonite particles (Kunipia F from Kunimine Kogyo Co.) having an aspect ratio of about 50-5000, is blended with an aqueous solution of about 10 weight-% of PVOH (Mowiol 15-99, having a saponification degree of above 99%) at 60-90° C. during 1-8 hours. The dispersion of exfoliated laminar mineral particles may be stabilised by means of a stabiliser additive. Alternatively, the laminar mineral particles are exfoliated directly in the PVOH-solution at 60-90° C. during 1-8 hours.

The wet applied coating is then dried at a web surface temperature of 100-150° C.

On the inside of the thus applied gas barrier layer is laminated a layer of HDPE comprising talcum particles having a particle size distribution such that 95% of the particles are smaller than 5.5 m, while 50% of the particles are smaller than 2.2 m, at an amount of 30 weight-%, the thickness of the HDPE layer being approximately 20 g/m². The filled HDPE layer is laminated to the oxygen barrier coated paperboard by means of co-extrusion together with an intermediate lamination layer consisting of conventional LDPE at a thickness of 15 g/m².

For comparison, a corresponding laminate having no layer of filled HDPE is prepared, i.e. having only two layers of conventional LDPE at a thickness of 15 g/m², each.

For further comparison, corresponding laminates having the same inside layers of LDPE and filled HDPE, respectively, but not the liquid film coated oxygen barrier layer of PVOH.

The water vapour barrier properties of each respective laminate, were determined by measuring weight loss on a Gravitest 6300 device (from GINTRONIC in Switzerland), by an automised weighing system. The measurements were performed at 23° C. and 50% RH (relative humidity), according to the DIN 53122 and ASTM E96/80 norms, during 6 weeks. The values obtained are expressed as g/m² day.

The reason for not measuring by conventional water vapour transmission methods, is that such methods are not accurate enough and also, the laminate samples had to be put in the wrong direction into a Permatran WVTR equipment. The water vapour migration through the laminate takes place in the opposite direction through the laminate, and therefore such a measurement method does not well reflect the reality of a laminate used in a packaging container.

Accordingly, measurements obtained by the Gravitest 6300 method were more realistic and produced values at an accuracy of is +/−0.1 mg.

| Sample | Material Structure (g/m²) | WL Gravitest |
|---|---|---|
| 4512-4a-C92 | /LDPE 12/paperboard/PVOH + 30% b/LDPE 15/LDPE 15/ | 0.29 |
| 4512-4i | /LDPE 12/paperboard/LDPE 15/LDPE 15/ | 0.61 |
| 4512-4a-C92 | /LDPE 12/paperboard/PVOH + 30% b/LDPE 10/filled HDPE 20/ | 0.18 |
| 4512-4j | /LDPE 12/paperboard/LDPE 10/filled HDPE 20/ | 0.31 |

It is known when calculating barrier properties of a laminated, layered, structure, the barrier contribution by each layer (Barr 1, Barr 2 .... Barr i) to the total barrier value (Barr Σ 1–i) of the complete laminate is related according to the following formula:

$$1/\text{Barr } \Sigma\ 1-i = 1/\text{Barr } 1 + 1/\text{barr } 2 + \ldots + 1/\text{Barr } i$$

Accordingly, by inserting the total water vapour barrier value for a laminate having a structure with a LFC layer of PVOH and bentonite inorganic particles and a conventional LDPE layer towards the inside, and the value of a structure having the LDPE inside layer alone, the rest of the laminate (i.e. the PVOH layer) has a calculated WV barrier value of 0.66.

$$1/\text{Total } WL = 1/\text{PVOH} + b\ WL + 1/2 \times \text{LDPE}\ WL \text{ and}$$

$$1/0.49 = 1/\text{PVOH}_{LDPE} + 1/1.88$$

$$\rightarrow \text{PVOH}_{LDPE} = 0.66$$

When instead inserting the total water vapour barrier value for a laminate having a structure with a LFC layer of PVOH and bentonite inorganic particles and a filled HDPE layer towards the inside, and the value of a structure having the filled HDPE inside layer alone, the rest of the laminate (i.e. the PVOH layer) has a calculated WV barrier value of 0.39.

$$1/\text{Total } WL = 1/\text{PVOH} + b\ WL + 1/(\text{LDPE} + \text{filled HDPE})\ WL$$

$$1/0.23 = 1/\text{PVOH}_{f\text{-}HDPE} + 1/0.55$$

$$\rightarrow \text{PVOH}_{f\text{-}HDPE} = 0.39$$

This water vapour barrier value is much lower than expected, and in fact improved by 40% compared to the structure with the LDPE inside layer.

Also, surprisingly, the oxygen barrier properties are now improved to well above sufficient for long term storage of packages filled with liquid food product.

It is possible to further increase the gas barrier properties a little by coating thicker layers of the gas barrier composition, or to fill the PVOH layer with higher amount of inorganic particles. There is, also, a more significant gain in odour barrier properties, by coating a thicker and more densely filled gas barrier layer composition. An excellent example of such a barrier composition comprises PVOH and between 10 and 60 weight-%, preferably from 20 to 55 weight-%, more preferably from 30 to 50 weight-% of talcum particles.

The invention is not limited by the embodiments shown and described above, but may be varied within the scope of the claims.

Clauses

A) Method of manufacturing a packaging laminate (10a; 10b) according to the invention, comprising the steps of
providing a layer of paper or paperboard (21a),
providing a liquid gas barrier composition containing a polymer binder dispersed or dissolved in an aqueous or solvent-based liquid medium and further containing inorganic particles dispersed in the composition,
forming a thin oxygen gas barrier layer comprising said polymer binder and inorganic particles by coating (22a) the liquid composition as a film onto a first side of said layer of paper or paperboard and subsequently drying (22b) to evaporate the liquid,
providing a melt processable polymer composition comprising a polyolefin-based polymer matrix and inorganic filler particles distributed therein,
providing a water vapour barrier layer (24a; 23b; 23c) from the melt processable polymer composition by a melt extrusion method,
laminating the extruded water vapour barrier layer (24a; 23b; 23c) from the melt processable polymer composition to the inner side of the oxygen gas barrier layer (21b),
providing an innermost layer (15) of a heat sealable polyolefin on the inside of the water vapour barrier layer (24a; 23b; 23c), and
providing an outermost layer (16) of a heat sealable polyolefin on the outside of the core layer (11).

B) Method according to clause A, wherein the oxygen gas barrier layer (12) is coated directly onto the inner side of the core layer of paper or paperboard (11).

C) Method according to any one of clauses A or B, wherein the oxygen gas barrier polymer contained in the liquid composition is selected from a group consisting of PVOH, water-dispersible EVOH, starch, starch derivatives and combinations of two or more thereof.

D) Method according to any one of clauses A, B or C, wherein the oxygen gas barrier layer (12) is applied as two or more part-layers in two or more subsequent steps with intermediate drying, at an amount of from 1 to 3 g/m² each, preferably from 1.5 to 2 g/m² each.

E) Method according to any one of clauses A, B, C or D, further comprising the steps of liquid film coating an intermediate thermoplastic bonding layer (13') onto the applied oxygen gas barrier layer (12) and drying it by evaporating the liquid, providing a water vapour barrier film (14, 14-15; 23b, 23c) from the melt processable polymer composition by means of extrusion or co-extrusion casting or blowing and laminating the film to the inner side of the oxygen gas barrier layer (21b) by means of heat-pressure laminating it to the intermediate thermoplastic bonding layer (13').

F) Method according to any one of clauses A, B, C, D, or E, wherein an innermost layer(s) (15) of a heat sealable polyolefin is provided on the inside of the water vapour barrier layer (24a; 23c) by means of (co-)extrusion coating.

The invention claimed is:

1. Non-foil packaging laminate having barrier properties suitable for long term packaging of a liquid food product, comprising a core layer of paper or paperboard, a first outermost liquid tight, heat sealable polyolefin layer, a second innermost liquid tight, heat sealable polyolefin layer and, applied onto the inner side of the core layer of paper or paperboard, an oxygen gas barrier layer formed by liquid film coating of a liquid gas barrier composition and subsequent drying, the liquid composition containing a polymer binder providing gas barrier properties, dispersed or dissolved in an aqueous or solvent-based medium, wherein the gas barrier layer further contains inorganic particles dispersed within the polymer binder in combination with that the packaging laminate further comprises a water vapour barrier layer, arranged between said applied oxygen gas barrier layer and said innermost heat sealable polyolefin layer, which water vapour barrier layer comprises a polyolefin-based matrix polymer and inorganic filler particles distributed within the matrix polymer.

2. Packaging laminate for liquid food packaging according to claim 1, wherein said polymer binder is selected from the group consisting of PVOH, water dispersible EVOH, starch, starch derivatives and combinations of two or more thereof.

3. Packaging laminate according to claim 1, wherein the inorganic particles comprised in the liquid gas barrier composition are laminar in shape, or flake-formed.

4. Packaging laminate according to claim 3, wherein the inorganic particles comprised in the liquid gas barrier composition mainly consist of laminar nano-sized clay particles having an aspect ratio of from 50 to 5000.

5. Packaging laminate according to claim 3, wherein the inorganic particles comprised in the liquid gas barrier composition mainly consist of laminar talcum particles having an aspect ratio of from 10 to 500.

6. Packaging laminate according to claim 1, wherein said oxygen gas barrier layer is applied at a total amount of from 0.5 to 6 g/m² dry weight.

7. Packaging laminate according to claim 1, wherein the oxygen gas barrier layer is applied directly adjacent onto the core layer of paper or paperboard.

8. Packaging laminate according to claim 1, wherein the matrix polymer comprises mainly high density polyethylene.

9. Packaging laminate according to claim 1, wherein the inorganic filler particles comprised in the polyolefin-based matrix polymer are flake-formed or have a laminar configuration.

10. Packaging laminate according to claim 1, wherein the inorganic filler particles comprised in the polyolefin-based matrix polymer are selected from talcum, mica and exfoliated nano-sized particles.

11. Packaging laminate according to claim 1, wherein said water vapour barrier layer comprises multiple, alternating micro-meter thin layers of polyolefin-based matrix polymer with inorganic particles and layers of a tough, shock-absorbing polymer selected from the group consisting of LLDPE, m-LLDPE, VLDPE, ULDPE, elastomers and plastomers.

12. Packaging laminate according to claim 1, wherein said water vapour barrier layer is bonded to the barrier-coated paper or paperboard layer by an intermediate thermoplastic polymer layer selected from polyolefins and polyolefin-based adhesive polymers.

13. Method of manufacturing a packaging laminate according to claim 1, comprising
providing a layer of paper or paperboard,
providing a liquid gas barrier composition containing a polymer binder dispersed or dissolved in an aqueous or solvent-based liquid medium and further containing inorganic particles dispersed in the composition,
forming a thin oxygen gas barrier layer comprising said polymer binder and inorganic particles by coating the liquid composition as a film onto a first side of said layer of paper or paperboard and subsequently drying to evaporate the liquid,
providing a melt processable polymer composition comprising a polylefin-based polymer matrix and inorganic filler particles distributed therein,
providing a water vapour barrier layer from the melt processable polymer composition by a melt extrusion method,
laminating the extruded water vapour barrier layer from the melt processable polymer composition to the inner side of the oxygen gas barrier layer,
providing an innermost layer of a heat sealable polyolefin on the inside of the water vapour barrier layer, and
providing an outermost layer of a heat sealable polyolefin on the outside of the core layer.

14. Method according to claim 13, wherein the oxygen gas barrier layer is applied in a total amount of from 0.5 to 6 g/m² dry weight.

15. Method according to claim 13, wherein the water vapour barrier layer of the melt processable polymer composition is provided and laminated to the inner side of the oxygen gas barrier layer, by means of extrusion coating or co-extrusion coating onto the coated paperboard.

16. Method according to claim 13, wherein the water vapour barrier layer of the melt processable polymer composition is provided by extrusion or co-extrusion casting or blowing of a film, which is subsequently laminated to the inner side of the oxygen gas barrier layer, by means of extrusion laminating with an intermediate thermoplastic bonding layer.

17. Method according to claim 15, wherein an innermost layer of a heat sealable polyolefin is provided on the inside of the water vapour barrier layer by being co-extrusion formed in the same step and together with the water vapour barrier layer.

18. Method according to claim 13, wherein said water vapour barrier layer is bonded to the barrier-coated paper or paperboard layer by an intermediate thermoplastic polymer layer selected from polyolefins and polyolefin-based adhesive polymers.

19. Packaging container manufactured from the packaging laminate as specified in claim 1.

* * * * *